Aug. 23, 1966  D. E. HAUGEN  3,268,369
PROCESS FOR HARDENING THE ALUMINUM ALLOY PORTION
OF AN ALUMINUM ALLOY-STEEL BEARING
Original Filed April 10, 1961
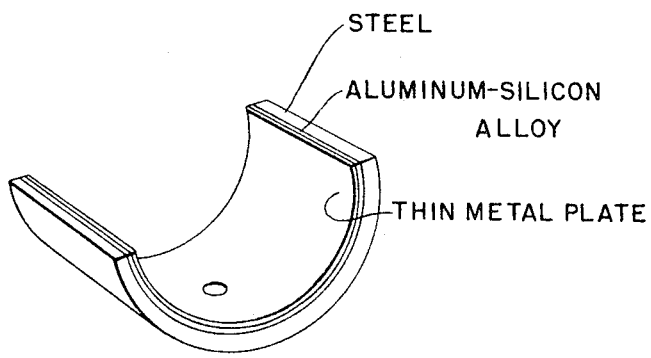
INVENTOR.
Derrolle E. Haugen
BY
His Attorney 3,268,369
PROCESS FOR HARDENING THE ALUMINUM ALLOY PORTION OF AN ALUMINUM ALLOY-STEEL BEARING
Derrolle E. Haugen, Dayton, Ohio, assignor to General Motors Corporation, Detroit, Mich., a corporation of Delaware
Original application Apr. 10, 1961, Ser. No. 102,005. Divided and this application Sept. 8, 1964, Ser. No. 394,936
4 Claims. (Cl. 148—12.7)

This is a division of application Serial No. 102,005, filed April 10, 1961, now abandoned.

This invention relates to fatigue resistant aluminum alloys and is particularly concerned with fatigue resistant, high precision aluminum alloy bearings.

It is, therefore, an object of this invention to provide a method for making aluminum alloy material, including silicon, highly fatigue resistant through the medium of precipitating the silicon in uniformly dispersed sub-microscopic particles throughout the aluminum after finish-machining of the material.

Another object of the invention is to improve the fatigue resistance of high precision bearings formed from aluminum-silicon alloy material through the medium of providing a uniform dispersion of silicon particles in a sub-microscopic dispersion throughout the aluminum.

In carrying out this object, it is a further object to improve the fatigue resistance of aluminum-silicon alloy material bonded to steel for use in bearings wherein the bearings may be finish-machined prior to the heat treatment thereof and wherein the fatigue resistance of the bearings may be greatly improved through heat treatment, said bearings in many instances being subsequently plated.

Further objects and advantages will be apparent, reference being had to the accompanying drawing which depicts a composite bearing of a semi-cylindrical type in perspective.

In the manufacture of bearing material such as thrust washers, planar bearings, surface semi-cylindrical bearings, cylindrical bearings, conical bearings and the like, it has been found that aluminum alloy material including silicon produces a highly suitable bearing surface that has good wear and frictional characteristics. One of such aloys is fully described in Schluchter Patent 2,238,399. Also, in Schluchter Patents 2,766,116; 2,763,546; 2,807,540; 2,752,239; 2,752,240; 2,754,202; 2,770,031 and 2,831,764 additional useful alloys of aluminum including silicon and other ingredients are disclosed. The use of the alloys is further improved for use in engine bearings, by the addition of a very thin electroplated player of high lead alloy at the bearing surface.

Composite bearings including an aluminum alloy bonded to steel and overlayed with an electroplate are disclosed in Schultz Patents 2,586,099 and 2,586,100 and methods for forming bearings of this character are fully disclosed in Schultz Patent 2,809,422 and Mushovic and Schultz Patent 2,782,498. In these patents, critical controls are discussed for preventing formation of a brittle iron--aluminum interlayer in the manufacture of the composite material used in the formation of the bearings. Bearings of this nature have found high commercial success and are used in many of today's automotive vehicle engines.

It has been found in some instances, utilizing specific designs and under extreme load conditions, that fatigue sometimes appears in the aluminum alloy where minute deflections occur due to the design of the bearing support.

This condition is probably amplified by operations carried out during the manufacture of the composite strip since the strip requires annealing prior to forming and broaching which causes at least some of the silicon to precipitate into unduly large particles and the bearing metal to lose some of its resistance toward fatigue.

In order to overcome these isolated conditions of fatigue, I have found that a specific solution heat treatment of the bearing material overcomes the condition wherein said treatment may be performed on the bearings after they have been completely finish-machined. The treatment may be said to homogenize the structure by creating a sub-microscopic highly dispersed and uniform condition of the silicon hardener within the alloy wherein the finely dispersed condition of the silicon particles actually improves the hardening effect of the silicon and increases the fatigue resistance thereof.

Great care is required during cladding to prevent formation of a brittle iron-aluminum interlayer and close controls must also be observed during the solution heat treating step to make sure that the interface between the aluminum alloy and the steel remains free of this constituent.

Improved results are also obtained by using a very thin aluminum-silicon alloy layer. Such a layer has greater inherent resistance to fatigue and reduces the cost of the bearing. This stratum of the bearing should not exceed .020 of an inch. Obviously, such a layer requires support and the steel backing coextensively bonded thereto provides such support. The bond must be substantially free from any brittle iron-aluminum alloy which forms readily if temperatures are not controlled during the solution heat treatment steps since too high a temperature at too long a period of heating may result in the formation of this very objectionable interlayer.

An aluminum on steel bearing is shown and includes a steel backing having an aluminum silicon alloy bonded coextensively thereto with a very thin metal plate thereover. In making the bearing, aluminum alloy bonded to steel strip is cut to size and is formed to semi-cylindrical shape. This bearing is then finished-broached at the aluminum alloy surface thereof to a precision dimension. The machined bearing is then heated in a non-oxidizing atmosphere to a temperature of at least 750° F. but below the eutectic melting point of the silicon-aluminum alloy therein. The heating or soaking is carried out for a period sufficient to cause a major portion of the silicon to go into solid solution with the aluminum under equilibrium conditions whereupon the part is immediately quenched in a fluid vehicle such as water, oil, etc., maintained at about room temperature. The quenching step causes the silicon to precipitate out in sub-microscopic particles uniformly dispersed throughout the aluminum alloy. Subsequently, the bearing may be electroplated at the bearing surface thereof with a very thin layer, preferably not in excess of .001" with a high lead alloy.

The soaking period noted above must be carefully controlled with respect to two factors, first, the temperature must be maintained sufficiently low to prevent cracking of the surface of the alloy and in this connection I have found that when processing an alloy having the composition of Cd .75%–1.4%, Si 3.5%–4.5% by weight that a temperature of about 1040° F. for a period of about five minutes is satisfactory. Longer periods, even up to 20 hours, give no further improvement in hardness, however, in this respect the second factor should be considered, namely, that the heat treatment of the composite article should not be so long as to cause formation of any brittle iron-aluminum interlayer at the interface between the aluminum alloy and the steel. Thus, for practical purposes, the shorter the time period of heating the better, providing the entire composite bearing reaches the desired temperature.

There should be as little time delay as possible between the heating and the quenching to effect optimum conditions and to obtain the maximum fatigue resistance. A minimum hardness of 62 on the Rockwell 15T scale is desirable, this reading being for .010" of aluminum alloy on steel. An increase in aluminum thickness results in a lower reading on the superficial hardness scale. A change of .002" in aluminum thickness results inversely in an apparent hardness change of 2½ points on the Rockwell 15T scale in either direction as the case may be.

After the bearing has been heat treated as above mentioned it may then be electroplated at the bearing surface with a high lead bearing alloy through co-plating procedures. Similar procedures and similar limits may be used in connection with other aluminum-silicon alloys, some of which are noted in the aforementioned Schlucter patents. It should be understood that the hardening and fatigue resistant improvements obtained by the teachings herein are obtained on any aluminum alloy including silicon wherein the silicon is present in quantities of not in excess of the eutectic composition of 11.6% by weight, whether or not other alloying ingredients are present.

Some specific examples in the manufacture of specific bearings are as follows, it being understood that these are exemplary only, and that variation in the aluminum alloy within wide ranges as set forth herein produce satisfactory materials according to the intended use thereof. The bearings formed by following the examples herein are automotive and heavy duty engine bearings.

*Example I.—Diesel rod bearing*

An aluminum-on-steel bearing of semi-cylindrical design was provided having a steel backing of SAE 1010 steeel .118" thick to which was coextensively bonded an aluminum alloy having a composition of 3.5% silicon, .75 cadmium, balance aluminum, the bimetal composite material having an as-clad thickness of .131". The bearing was machined to a precision thickness, resulting in .010" aluminum alloy overlay at the bearing surface thereof and thereafter was heated for 10 minutes under non-oxidizing conditions at a temperature of 1025° F. The heated part was immediately quenched in water at 100° F. maximum. The aluminum silicon alloy layer was tested for hardness and found to have an average hardness of 64 on the Rockwell 15T scale. Thereafter, the bearing was plated at the bearing surface thereof with a coplate of 8.2% tin, 1.84% Cu, balance lead, wherein the coplated layer had average thickness of .00055". Average hardness of same material before solution-heat-treatment was 49, R15T.

*Example II.—Diesel main bearing*

An aluminum-on-steel bearing of semi-cylindrical design was provided having a steel backing of SAE 1010 steel .151" thick to which was coextensively bonded an aluminum alloy having a nominal composition of 3.85% silicon, .84% cadmium, balance aluminum, the bimetal composite material having an as-clad thickness of .162". The bearing was machined to a precision thickness resulting in .012" of aluminum alloy overlay at the bearing surface thereof and thereafter was heated for eight minutes under non-oxidizing conditions at a temperature of 1010° F. The heated part was immediately quenched in oil at 90° F. maximum. The aluminum silicon alloy layer was tested for hardness and found to have an average hardness of 61 on the Rockwell 15T scale. Thereafter, the bearing was plated at the bearing surface thereof with a coplate of 10.1% tin, 1.38% Cu, balance lead, wherein the coplated layer had average thickness of .00045". The average hardness of the material before solution heat-treatment was 44 R15T.

*Example III.—Rod bearing (heavy duty)*

An aluminum-on-steel bearing of semi-cylindrical design was provided having a steel backing of SAE 1008 steel .055" thick to which was coextensively bonded an aluminum alloy having a nominal composition of 4.15% silicon, 1.10% cadmium, balance aluminum, the bimetal composite material having an as-clad thickness of .068". The bearing was machined to a precision thickness, resulting in .007" of aluminum alloy overlay at the bearing surface thereof and thereafter was heated for 15 minutes under non-oxidizing conditions at a temperature of 980° F. The heated part was immediately quenched in water at 90° F. maximum. The aluminum silicon alloy layer was tested for hardness and found to have an average hardness of 67 on the Rockwell 15T scale. Thereafter, the bearing was plated at the bearing surface thereof with a nominal coplate composition of 8.9% tin, 1.59% Cu, balance lead, wherein the coplated layer had average thickness of .00040". The average hardness of the same material before solution heat-treat was 57, R15T.

*Example IV.—Rod bearing (heavy duty)*

An aluminum-on-steel bearing of semi-cylindrical design was provided having a steel backing of SAE 1010 steel .055" thick to which was coextensively bonded an aluminum alloy having a composition of 2.8% silicon, .33% chromium, 30% magnesium, 96.5% aluminum, the bimetal composite material having an as-clad thickness of .068". The bearing was machined to a precision thickness, resulting in .006" of aluminum alloy overlay at the bearing surface thereof and thereafter was heated for ten minutes under non-oxidizing conditions at a temperature of 1000° F. The heated part was immediately quenched in water at 60° F. The aluminum-silicon alloy layer was tested for hardness and found to have an average hardness of 69 on the Rockwell 15T scale. Thereafter, the bearing was plated at the bearing surface thereof with a nominal coplate composition of 10.3% tin, 1.82% copper, balance lead, wherein the coplated layer had average thickness of .00050". The average hardness of the same material before solution heat-treatment was 59, R15T.

After solution heat treating and before plating the bearings may be aged if desired. The aging should be carried out at about 300° F.–375° F., preferably 350° F. for about ten hours, when used.

In the foregoing description and in the claims to follow it is understood that the term silicon includes the element and compounds containing the element which are susceptible to solution heat treating.

While the embodiments of the present invention as herein disclosed constitute preferred forms, it is to be understood that other forms might be adopted.

What is claimed is as follows:

1. A process for improving the fatigue resistance and hardness of the aluminum alloy portion of an aluminum alloy-steel bearing comprising the steps of:
   (a) coextensively metallurgically bonding an aluminum alloy which includes silicon in quantities of from about 2.5% to 11.6% by weight to a steel support,
   (b) forming the resulting bearing to the desired shape,
   (c) machining the aluminum alloy surface of the bearing to the desired thickness,
   (d) heating the bearing to a temperature of at least 750° F. but not in excess of about 10° F. below the eutectic melting point of the aluminum alloy,
   (e) maintaining the bearing at said temperature for a period of at least five minutes to cause at least a portion of the silicon in the aluminum alloy to go into solution, the length of said period being insufficient to cause the formation of any substantial quantity of brittle iron-aluminum alloy at the interface between the aluminum alloy and the steel, and
   (f) before the temperature of the bearing has cooled in excess of about 15° F., quenching the bearing in a fluid maintained at about room temperature for causing the silicon in the aluminum alloy to precipitate in the form of sub-microscopic particles dispersed uniformly within said aluminum alloy, whereby the fatigue resistance and hardness of the bearing is substantially increased.

2. The process of claim 1 in which in step (e) the bearing is maintained at said temperature for a period of at least 5 mins. to cause at least a major portion of the silicon in the aluminum alloy to go into solution, the length of said period being insufficient to cause the formation of any substantial quantity of brittle iron-aluminum alloy in the interface between the aluminum alloy of the steel.

3. The process of claim 2 in which in step (d) the bearing is heated in a non-oxidizing atmosphere to a temperature of at least 750° F. and not in excess of about 1060° F.

4. The process of claim 3 in which in step (a) the aluminum alloy includes silicon in quantities of from 2.5% to 5% by weight, in which in step (c) the aluminum alloy surface of the bearing is machined to a thickness of the order of .006″–.012″, in which in step (d) the bearing is heated to a temperature of from 980° F. to 1025° F., in which in step (e) the bearing is maintained at said temperatures for a period of about 15 to 8 minutes according to the temperature, and in which in step (f) the bearing is quenched in water at from 60° F. to 100° F.

References Cited by the Examiner

UNITED STATES PATENTS

| | | | |
|---|---|---|---|
| 2,586,099 | 2/1952 | Schultz | 29—196.2 |
| 2,586,100 | 2/1952 | Schultz | 29—196.2 |
| 2,687,565 | 8/1954 | Schaefer et al. | 29—196.2 |
| 2,807,540 | 9/1957 | Schluchter | 148—159 |
| 2,837,450 | 6/1958 | Moore et al. | 148—127 |

FOREIGN PATENTS 577,986    6/1946    Alexander et al.

DAVID L. RECK, *Primary Examiner.*

R. O. DEAN, *Assistant Examiner.*